United States Patent
Wang

(10) Patent No.: US 10,417,742 B2
(45) Date of Patent: Sep. 17, 2019

(54) SYSTEM AND APPARATUS FOR EDITING PREVIEW IMAGES

(71) Applicant: ATEN International Co., Ltd., New Taipei (TW)

(72) Inventor: Ding-Yuan Wang, Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 0 days.

(21) Appl. No.: 15/652,650

(22) Filed: Jul. 18, 2017

(65) Prior Publication Data

US 2018/0025470 A1    Jan. 25, 2018

(30) Foreign Application Priority Data

Jul. 22, 2016  (TW) .............................. 105211132 U

(51) Int. Cl.
| | | |
|---|---|---|
| *G09G 5/00* | (2006.01) | |
| *G06T 3/40* | (2006.01) | |
| *G09G 5/14* | (2006.01) | |
| *G06T 11/60* | (2006.01) | |
| *G06F 3/14* | (2006.01) | |

(52) U.S. Cl.
CPC .............. *G06T 3/40* (2013.01); *G06F 3/1446* (2013.01); *G06T 11/60* (2013.01); *G09G 5/14* (2013.01); *G09G 2340/045* (2013.01); *G09G 2340/0407* (2013.01); *G09G 2340/0442* (2013.01); *G09G 2370/047* (2013.01)

(58) Field of Classification Search
CPC ..................................... G06T 3/40; G09G 5/14
See application file for complete search history.

(56) References Cited

U.S. PATENT DOCUMENTS

| | | | | |
|---|---|---|---|---|
| 6,333,752 | B1 * | 12/2001 | Hasegawa ........... | G06F 3/04845 345/581 |
| 7,595,796 | B2 * | 9/2009 | Ranganathan ........ | G06F 1/3215 345/214 |
| 8,400,370 | B2 * | 3/2013 | Yoshida ................ | G06F 3/1446 345/1.3 |
| 8,966,364 | B2 | 2/2015 | Ogino et al. | |
| 9,392,239 | B2 * | 7/2016 | Asamura .............. | H04N 9/3147 |
| 9,471,162 | B2 * | 10/2016 | Bae ......................... | G06F 3/041 |

(Continued)

FOREIGN PATENT DOCUMENTS

| | | |
|---|---|---|
| CN | 101118479 A | 2/2008 |
| CN | 101136978 A | 3/2008 |

(Continued)

OTHER PUBLICATIONS

Chinese Office Action, dated Dec. 10, 2018, and Search Report dated Nov. 24, 2018, in a counterpart Chinese patent application, No. CN 201610750592.8.

*Primary Examiner* — Martin Mushambo

(74) *Attorney, Agent, or Firm* — Chen Yoshimura LLP

(57) ABSTRACT

A system for editing preview images. The system includes at least one source end, a control terminal and at least one display end. The control terminal is coupled between the source end and the display end. The source end provides at least one image. The control terminal provides a user interface. The control terminal includes an image capture module, a previewing module and a media parameter module.

20 Claims, 6 Drawing Sheets

(56) References Cited

U.S. PATENT DOCUMENTS

| | | | |
|---|---|---|---|
| 2002/0054141 A1* | 5/2002 | Yen | G06F 3/0481 |
| | | | 715/804 |
| 2002/0101396 A1* | 8/2002 | Huston | G09G 3/002 |
| | | | 345/87 |
| 2005/0122479 A1* | 6/2005 | Mann | H04N 13/395 |
| | | | 353/28 |
| 2007/0104392 A1* | 5/2007 | Huang | G06T 3/40 |
| | | | 382/298 |
| 2008/0094669 A1 | 4/2008 | Imai | |
| 2009/0231361 A1* | 9/2009 | Schieltz | G06F 17/2223 |
| | | | 345/636 |
| 2009/0289946 A1* | 11/2009 | Goodart | G06F 3/1438 |
| | | | 345/520 |
| 2010/0315436 A1 | 12/2010 | Chan | |
| 2012/0079375 A1 | 3/2012 | Ogino et al. | |
| 2012/0147036 A1* | 6/2012 | Yoshikawa | H04M 1/72527 |
| | | | 345/629 |
| 2013/0127916 A1* | 5/2013 | Van Slembrouk | |
| | | | G06F 17/30905 |
| | | | 345/660 |
| 2013/0250180 A1* | 9/2013 | Wang | H04N 5/44 |
| | | | 348/720 |
| 2015/0116741 A1 | 4/2015 | Ogino et al. | |
| 2015/0187324 A1* | 7/2015 | Kim | G06F 3/1446 |
| | | | 345/1.3 |

FOREIGN PATENT DOCUMENTS

| | | |
|---|---|---|
| CN | 105224158 A | 1/2016 |
| TW | 201044262 | 12/2010 |

\* cited by examiner

SYSTEM AND APPARATUS FOR EDITING PREVIEW IMAGES

BACKGROUND OF THE INVENTION

Field of the Invention

This invention relates to a video image preview system, and in particular, it relates to a system for editing preview images and related apparatus.

Description of Related Art

Conventional print advertising methods have limited circulation, and the content of the advertisement cannot always attract the consumers' attention. Gradually, advertising is improved by technology, and advertisements are now transmitted throughout the world using network technologies. Moreover, animated advertisements create deeper impressions on the consumers. Further, advertisements have become interactive, allowing consumers to interact with the advertisements via display media, greatly improving the effectiveness of advertisements.

In recent years, video matrix display screens such as TV walls have replaced conventional print advertisements. Many cities and business districts have installed video matrix display screens to display advertisement images, such as movie trailers, product information, etc. Typically, a video matrix system is formed of X*X display devices pieced together; for example, a 4*4 matrix is formed by 16 display devices. A central control terminal is coupled to multiple display devices and multiple source devices, and controls and adjusts the display content from the source devices and various image parameters.

Conventional video matrix apparatus, switch and related user interface use a one-to-one connection, i.e., using a single user interface to perform adjustment of a single image source, and transmit the image to the video matrix apparatus. The process is cumbersome. In another conventional video matrix switch, although zooming capabilities are provided, a shortcoming is that the image source and the video matrix need to have the same aspect ratio, to avoid image distortion. This limits the size of the apparatus at both ends. Further, conventional technologies cannot perform processing on preview images; rather, preview images can only be generated after the adjustment process is complete, for confirmation purposes. This increases the complexity of the adjustment process.

SUMMARY

Accordingly, the present invention is directed to an editable image preview system and related devices, which allows the user to directly perform editing on preview images, such as image cutting, zooming in and out, calibration, etc., which significantly reduces the processing steps needed and saves time.

To achieve the above objects, the present invention provides a system for editing preview images, suitable for use in an image control apparatus, the system including: at least one source end, a control end, and at least one display end. The control end is coupled between the at least one source end and the at least one display end. The source end provides at least one image. The control end includes a user interface and a preview image editing module, the preview image editing module including a capture module, a preview module, and a media display parameter setting module. The capture module captures at least one specified area of the image. The preview module displays at least one preview window on the interface, to display the at least one specified area of the image. Using the interface, the media display parameter setting module edits and sets parameters related to the at least one specified area of the image. The at least one display end receives the at least one specified area of the image which was displayed in the preview windows.

In one aspect, a computer is coupled to the control end, and the user interface is displayed on the monitor of the computer, to receive at least some information related to the specified area and display it in a menu window of the interface. The information includes a width and a height and contains image content including image pixels.

The media display parameter setting module includes a correction unit, a cutting unit, a zoom unit, a combining unit and a selecting unit. The correction unit includes a first mode and a second mode, wherein in the first mode, the correction unit obtains Extended Display Identifier Data (EDID) of the at least one display end and automatically adjusts the aspect ratio based on the EDID, and wherein in the second mode, the correction unit receives a command containing parameters, and automatically adjusts the aspect ratio based on the received parameters.

The source end includes a plurality of media players for outputting a plurality of images. The control end includes an image switch, image distribution device or video matrix. The display end includes a plurality of display devices installed in a predetermined configuration forming a TV wall.

In another aspect, the present invention provides a device for editing preview images, coupled between at least one external source device and at least one external display device, the device including: a processing unit, a receiver, a memory unit, and a transmitter. The memory unit includes a preview image editing module, which includes a capture module, a preview module and a media display parameter setting module. The processing unit provides a user interface. The receiver receives an at least one image from the at lease one external source device. The preview unit provides at least one preview window on the interface. The capture unit provides a capture tool on the interface for capturing at least one specified area of the at least one image. The media display parameter setting unit edits and sets parameters related to the at least one specified area of the at least one image using the interface. The transmitter transmits the at least one specified area of the at least one image to the at least one external display device.

In another aspect, the device further includes an input unit for inputting commands and parameters. It further includes a computer, coupled to the device, for operating the user interface and displaying the preview window. The information includes a width and a height and contains image content including image pixels.

The media display parameter setting unit includes a correction unit, a cutting unit, a zoom unit, a combining unit, and a selecting unit. The correction unit corrects an aspect ratio of the specified area. The cutting unit cuts the specified area into a plurality of sub-areas. The zoom unit enlarges or reduces sizes of the plurality of sub-areas. The selecting unit pairs each of the plurality of sub-areas with one of the external display devices.

The correction unit includes a first mode and a second mode, wherein in the first mode, the correction unit obtains Extended Display Identifier Data (EDID) of the at least one display end and automatically adjusts the aspect ratio based on the EDID, and wherein in the second mode, the correction unit receives a command containing parameters, and automatically adjusts the aspect ratio based on the received parameters.

In another aspect, the present invention provides a computer-readable non-transitory memory, located in a control computer, for storing program code for editing preview images. The computer receives at least one image and provides a user interface. The computer-readable memory includes a preview image editing module, which includes a capture module, a preview module and a media display parameter setting module. The preview module provides at least one preview window on the interface for displaying the image. The capture unit provides a capture tool on the interface for capturing at least one specified area of the image. The media display parameter setting unit edits and sets parameters related to the at least one specified area of the at least one image using the interface.

The media display parameter setting unit includes a correction unit, a cutting unit, a zoom unit, and a selecting unit. The correction unit corrects an aspect ratio of the specified area. The cutting unit cuts the specified area into a plurality of sub-areas. The zoom unit enlarges or reduces sizes of the plurality of sub-areas. The selecting unit pairs each of the plurality of sub-areas with one of the external display devices.

With reference to these drawings and detailed descriptions below, the invention and its advantages can be understood.

DETAILED DESCRIPTION OF PREFERRED EMBODIMENTS

Embodiments of the present invention and their various aspects are described in detail below. These descriptions provide implementation details to enable a full understanding. Those skilled in the relevant art will appreciate that the invention may be practiced without some of the details. Further, details of certain well known structures and functions are omitted. Moreover, terms used in the descriptions below should be given broadest reasonable interpretation, even though they are used in the context of specific embodiments of the invention.

Figure 1:
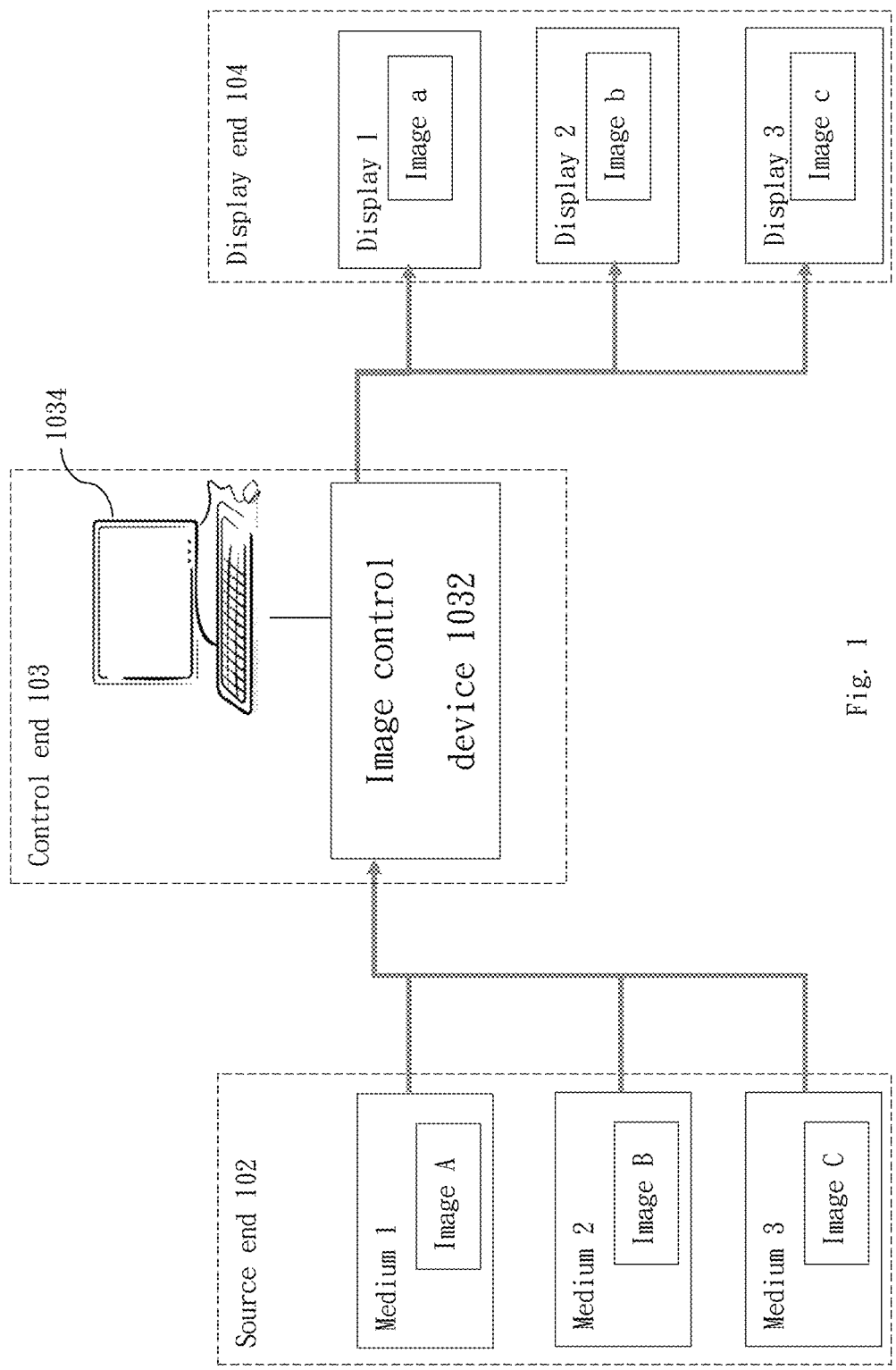
FIG. 1 illustrates the system architecture of a system according to a first embodiment of the present invention.

Referring to FIG. 1, which illustrates a system 100 providing editable preview images according to an embodiment of the present invention. The system employs an image control device 1032, and includes at least one source end 102 and a display end 104, where the image control device 1032 is coupled between the source end 102 and the display end 104. In a preferred embodiment, the image control device 1032 includes a video switch. The descriptions below uses a video switch as an example, but it should be understood that the invention is not limited to video switches.

The source end 102 includes multiple image output devices or media database, for providing multiple images to the video switch and the display end 104. For example, the source end 102 may include DVD players, cable digital video converter boxes, cable set-top boxes, satellite broadcast system, Blu-ray players, digital multifunctional disc players, smart phone, personal digital assistant, or other electronic devices having image output functions. The images may be static images or moving images. In some embodiments, the transmission of the image data may use an HTML template, using a web page format, to transmit the images to the devices at the display end. Because it uses web page format, web page editing techniques may be employed, such as Java Script or VB Script, to introduce animation effects for enhanced advertising effects. Web page editing techniques are commonly used and well known techniques so they are not described in detail here.

The display end 104 may include electronic devices having display functions, such as LCD (liquid crystal displays), projection displays, stereo display devices, LED (light emitting diode) displays, or virtual image display devices, etc.

The image output devices of the source end 102 can provide different images. For example, as shown in FIG. 1, medium 1 provides image A, medium 2 provides image B, and medium 3 provides image C. The images are transmitted by the image control device 1032 to the specified devices of the display end 104. For example, display 1 displays image a, display 2 displays image b, and display 3 displays image c. Further, the display end 104 may include a video matrix formed by a plurality, e.g. X*X, display devices, i.e., a display wall, such as a TV wall (not shown in the drawings), where the image output from the source end 102 is divided by the image control device 1032 into multiple sub-images, and transmitted by the image control device 1032 to the plurality of display devices, and respectively displayed on these devices to form a complete image.

Figure 3:
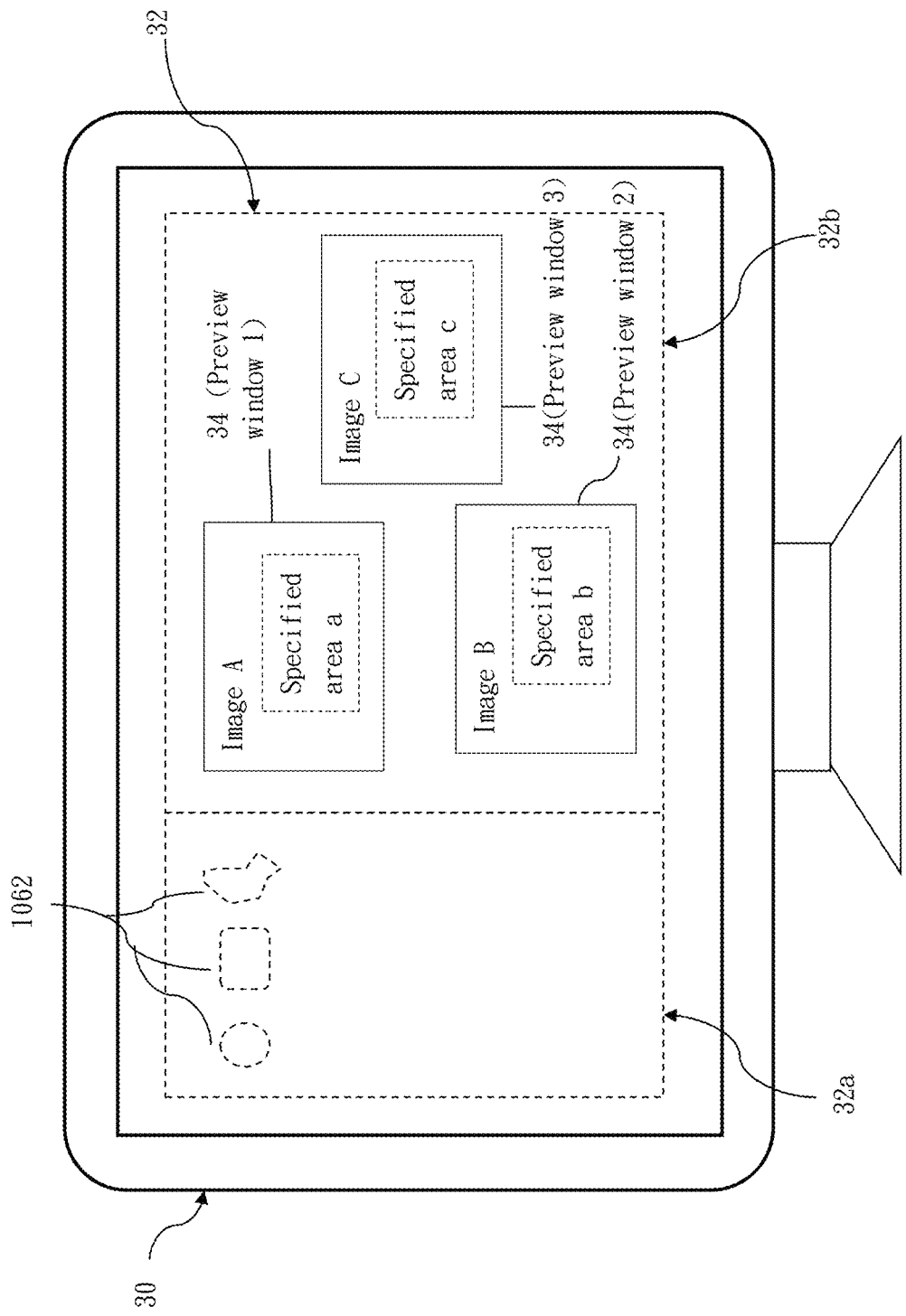
FIG. 3 illustrates a user interface display according to embodiments of the present invention.

Referring to FIG. 1, the system 100 further includes a control end 103, coupled between the source end 102 and the display end 104, which functions as a relay point or intermediary between the source end 102 and the display end 104. In a preferred embodiment, the control end 103 includes the image control device 1032 and a control host device (such as a computer) 1034, where the operator may use the host computer 1034 to control the image control device 1032. The image control device 1032 may be embedded in the host computer 1034, or they may be separate devices. The embodiment also includes a preview image editing module 101 for editing preview images, which may be stored in a computer-readable non-transitory memory, where the computer-readable memory is disposed in the image control device 1032 or the host computed 1034. The preview image editing module 101 may include multiple modules, including a capture module 106, a preview module 108, and a media display parameter setting module 110, as shown in FIG. 1. The host computer 1034 includes software or firmware for providing a user interface display 32, as well as input devices (such as keyboard or mouse, not shown in the drawings). The operator may use the user interface 32 and the input devices to execute the preview image editing module 101 stored in the computer-readable memory, so that the control end 103 receives the multiple images from the source end 102 and displays them on the user interface 32, as shown in FIG. 3. More specifically, the user interface 32 is displayed on the monitor 30 of the host computer 1034, and the user interface 32 includes a menu area 32a and at least one preview area 32b.

The capture module 106 is stored in the memory of the host computer 1034 (not shown in the drawings), and is executed by a processor of the host computer (not shown in the drawings). The capture module 106 provides multiple capture tools 1062 displayed on the user interface 32. As shown in FIG. 3, in one embodiment, the multiple capture tools 1062 includes selection modes such as rectangular selection, circular selection, free-shape selection, select all, etc. The operator chooses one of the capture tools 1062 based on need. After a capture tool 1062 is chosen, it can be used to capture a desired region of the image. For example, the operator may use a mouse to drag a rectangular area, circular area or free shape area on the user interface 32 to select a desired region. In another embodiment, the multiple different specified areas can be selected from the same image. It should be understood that in this disclosure, multiple specified areas may be selected from the same image or different images.

The preview module 108 is stored in the memory of the host computer 1034 (not shown in the drawings), and is executed by a processor of the host computer (not shown in the drawings). The preview module 108 provides multiple preview windows 34 on the user interface 32, for receiving the specified areas of images selected by the capture module 106. For example, referring to FIG. 3, image A, image B and image C from the source end 102 are transmitted to the image control device 1032 of the control end 103, and the operator uses the capture tools 1062 on the user interface 32 to select specified areas a, b and c from images A, B and C, respectively, which are respectively displayed in the preview windows 1, 2 and 3. In other words, the preview windows 1, 2 and 3 displays the specified areas a, b and c, respectively, as shown in FIG. 3. The number of preview windows 34 depends on the number of source devices of the source end and/or the number of display devices of the display end. The specified areas a, b and c each has a width and a height and contains image contents such as image pixels.

The media display parameter setting module 110 is stored in the memory of the host computer 1034 (not shown in the drawings), and is executed by a processor of the host computer (not shown in the drawings). The media display parameter setting module 110 provides a menu area 32a on the user interface 32, to enable the operator to adjust the parameters for each preview window 34, such as aspect ratio, orientation, position, the identity of the specified display device, etc. More specifically, the media display parameter setting module 110 includes a correction unit 110a, a cutting unit 110b, a zoom unit 110c, a combining unit 110d and a selecting unit 110e.

The correction unit 110a enables the operator to correct the aspect ratio of the preview window 34 to match the corresponding display screen size on the display end 104. Because the specified area captured using the capture tools 1062 does not necessarily match the aspect ratio of the display device on the display end 104, the correction unit 110a can solve this problem. The correction unit 110a includes a first mode and a second mode. In the first mode, the Extended Display Identifier Data (EDID) of the display end 104, including data related to the resolution of the display device, its, manufacturer's name and serial number, is first obtained. Typically, the EDID is stored in the PROM or EEPROM of the display device, and can be obtained using software and displayed. After the host computer 1034 of the control end 103 obtains the EDID, the correction unit 110a automatically adjusts the aspect ratio of the specified area based on the EDID so as to match the screen size at the display end 104. In other words, the first mode is an automatic adjustment mode. The adjustment of the aspect ratio of the specified area may be accomplished in several ways. For example, the adjustment may fit the height (or width) of the specified area to the height (or width) of the display device, and depending on the original aspect ratio of the specified area, either cut off a part of the specified area on the left and/or right (or on the top and/or bottom) or supply a blank area to the left and/or right of (or above and/or below) the specified area, so that the aspect ratio of the image content of the specified area is not changed. As another example, the adjustment may fit the height of the specified area to the height of the display device and also fit the width of the specified area to the width of the display device, as a result of which the aspect ratio of the image content may be changed.

In the second mode, the operator uses the input devices of the host computer 1034 to input commands or related parameters, such as the aspect ratio of the preview window 34. After the image control device 1032 receives these commands, it adjusts the aspect ratio of the specified area. The adjustment may be accomplished in similar ways as described in the preceding paragraph. Compared to the first mode, the second mode relies on the manually inputted commands to adjust the aspect ratio, and is referred to as the manual adjustment mode.

Figure 4:
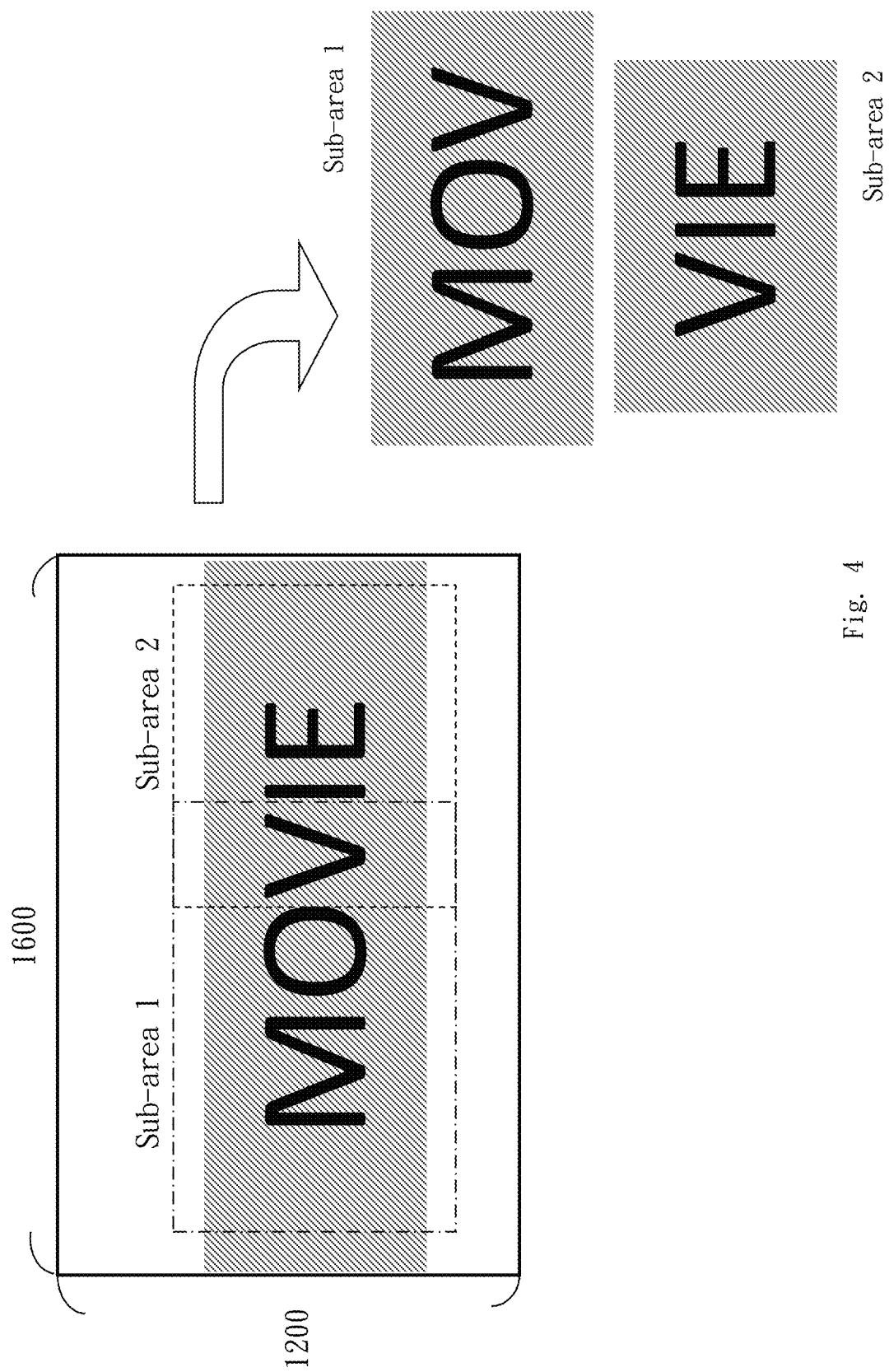
FIG. 4 schematically illustrates image cutting in embodiments of the present invention.

The cutting unit 110b enables the operator to cut the specified area into multiple sub-areas, as shown in FIG. 4. In one embodiment, the display end 104 has a rectangular display area formed by X*X display devices, and the cutting unit 110b cuts the specified area into X*X sub-areas. The image of each sub-area is transmitted to the corresponding display device, so that the rectangular display area as a whole displays the image of the specified area. The cutting unit 110b includes a cutting algorithm which, based on pixels of the image signal, selects the start and end pixels of the cuts to determine the cut regions. For example, referring to FIG. 4, to cut the specified area to two sub-areas, the cutting algorithm is as follows:

Sub-area 1: Start at (100, 200); width 1280; height 1024;
Sub-area 2: Start at (1180, 200); width 1280; height 1024;

Taking the above formula for sub-area 1 as an example, it means that starting at pixel (100, 200), a sub-area of width 1280 and height 1024 is cut; for sub-area 2, it means that starting at pixel (1180, 200), a sub-area of width 1280 and height 1024 is cut. Those skilled in the relevant art will appreciate that cutting algorithms are well known, so they are not explained in detail here.

The zoom unit 110c enables the operator to simultaneously enlarge or reduce the sizes of multiple sub-areas. In the above embodiment, the multiple sub-areas processed by the cutting unit 110b can be further processed by the zoom unit 110c to adjust them to designed sizes. In alternative embodiments, the zoom unit 110c may enable the operator to independently enlarge or reduce the size of individual sub-areas; this alternative method may be especially useful when the aspect ratios of the specified areas have been adjusted via the manual adjustment mode described above. In another embodiment, the zoom unit 110c and the correction unit 110a may be combined into one module, and it can include both the first mode and the second mode, i.e. the automatic adjustment mode and the manual adjustment mode.

The combining unit 110d enables the operator to combine the multiple zoomed sub-areas into the original image. In one embodiment, the combining is based on the start and end pixels of the sub-areas in the cutting algorithm used by the cutting unit 110b. In different embodiments, the cutting unit 110b, the zoom unit 110c and the combining unit 110d may be combined into one module, or may be separate units.

The selecting unit 110e enables the operator to pair the multiple specified areas or multiple sub-areas with corresponding display devices 104 where the sub-images are transmitted to. For example, the specified areas a, b and c may be paired respectively with and transmitted to display devices 1, 2 and 3. In another example, sub-areas 1 and 2 may be respectively transmitted to displays 1 and 2, etc.

Figure 2:
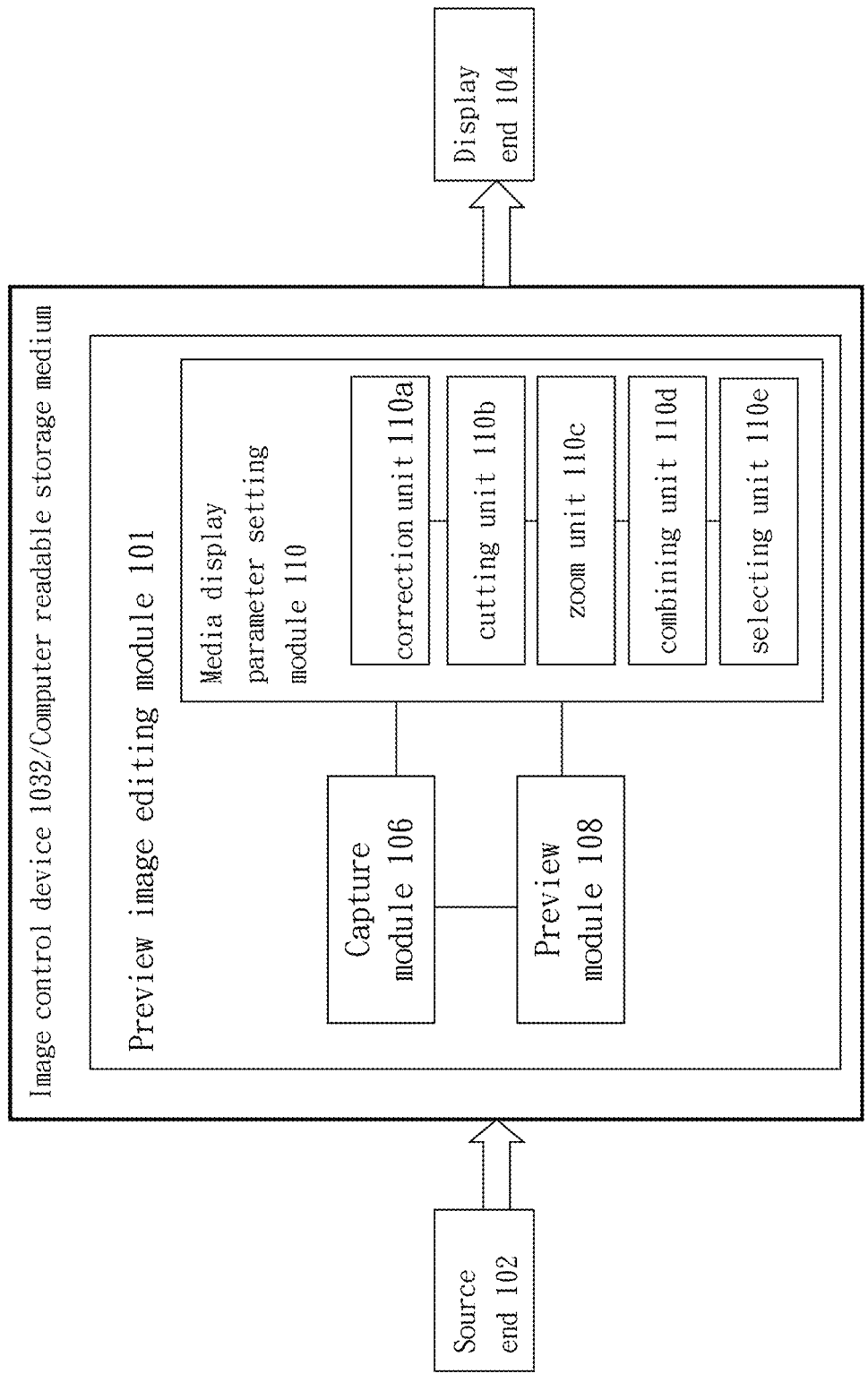
FIG. 2 is a block diagram showing the first embodiment of the present invention.
Figure 5:
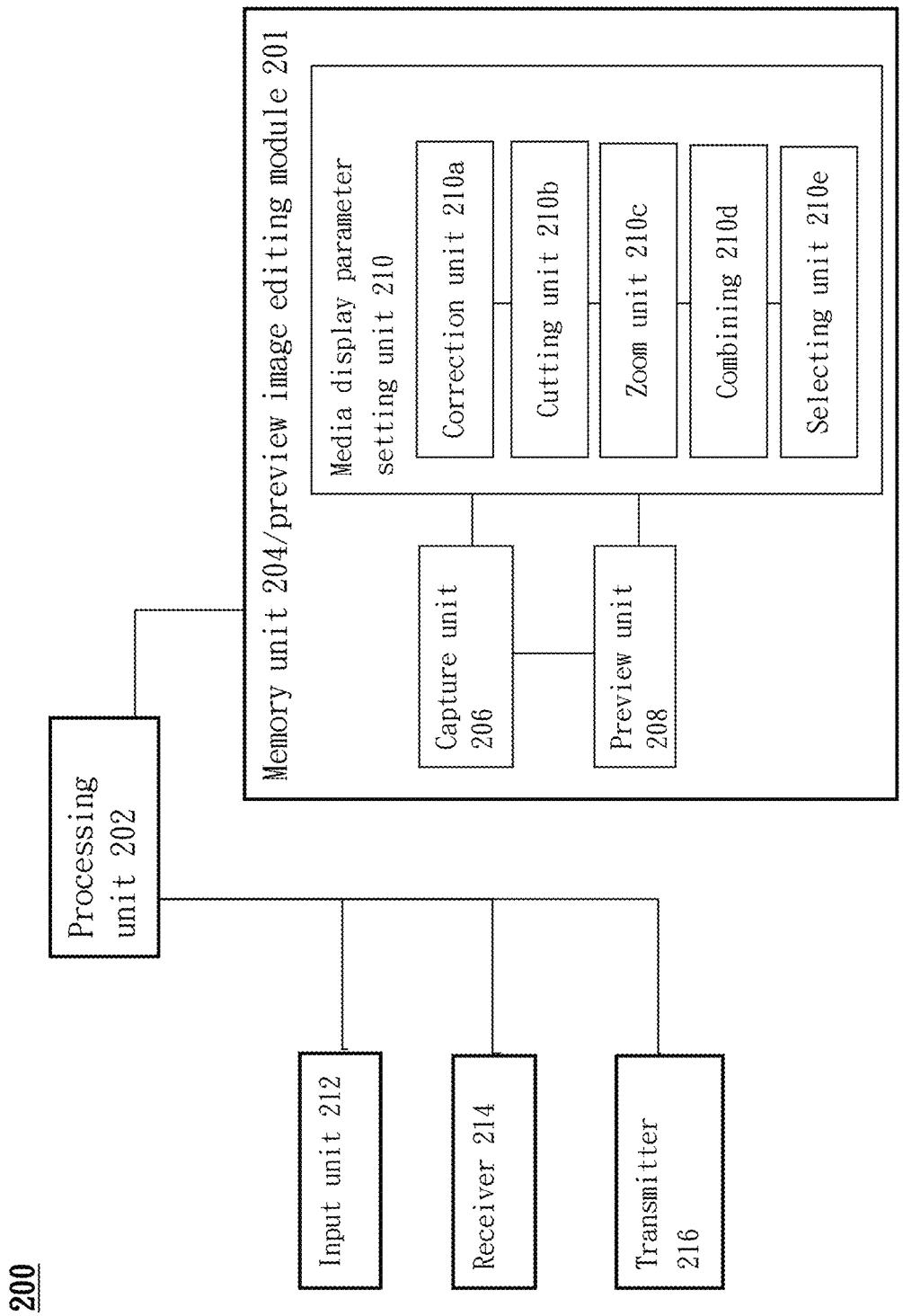
FIG. 5 is a block diagram according to a second embodiment of the present invention.

Refer to FIG. 5, which shows a device 200 which provides editable preview images according to another embodiment of the present invention. The device 200 for providing editable preview images is coupled to a source end (such as the source end 102 shown in FIG. 2) and a display end (such as the display end 104 shown in FIG. 2). In a preferred embodiment, the device 200 for providing editable preview images includes an image control device 1032 and a control host (e.g. a computer) 1034 in an integral unit. In a preferred embodiment, the image control device 1032 includes a video switch. The descriptions below uses a video switch as an example, but it should be understood that the invention is not limited to video switches. This embodiment may be implemented as computer programs stored in computer readable non-transitory memory as a part of the device 200.

The device 200 for providing editable preview images includes a processing unit 202, a memory unit 204, an input unit 212, a receiver 214 and a transmitter 216. The memory 204 is a computer readable non-transitory memory that stores a preview image editing module 201. The preview image editing module 201 includes a capture unit 206, a preview unit 208, and a media display parameter setting unit 210, stored in the memory. The capture unit 206, the preview unit 208, and the media display parameter setting unit 210 are executed by the processing unit 202. The receiver 214 receives multiple images from the source end 102. The transmitter 216 transmits images that have been processed by the device 200 to the display end 104. The receiver 214 and the transmitter 216 may be wired or wireless transmission components. The input unit 212 may be used to input commands or related parameters into the device 200.

The capture unit 206 is similar to the capture module 106 of the first embodiment. The capture unit 206 provides multiple capture tools displayed on the user interface. As shown in FIG. 3, in one embodiment, the multiple capture tools includes selection modes such as rectangular selection, circular selection, free-shape selection, select all, etc. The operator chooses one of the capture tools based on need. After a capture tool is chosen, it can be used to capture a desired region of the image. For example, the operator may use a mouse to drag a rectangular area, circular area or free shape area on the user interface to select a desired region. In another embodiment, the multiple different specified areas can be selected from the same image. It should be understood that in this disclosure, multiple specified areas may be selected from the same image or different images.

The preview unit 208 is similar to the preview module 108 of the first embodiment. The preview unit provides multiple preview windows on the user interface, for receiving the specified areas of images selected by the capture unit. For example, image A, image B and image C from the source end are transmitted to the image control device of the control end, and the operator uses the capture tools on the user interface to select specified areas a, b and c from images A, B and C, respectively, which are respectively displayed in the preview windows 1, 2 and 3. In other words, the preview windows 1, 2 and 3 displays the specified areas a, b and c, respectively. The number of preview windows 34 depends on the number of source devices of the source end and/or the number of display devices of the display end. The specified areas a, b and c includes image pixels, aspect ratio and other corresponding data.

The media display parameter setting unit 210 is similar to the media display parameter setting module 110 of the first embodiment. The media display parameter setting unit 210 provides a menu area on the user interface, to enable the operator to adjust the parameters for each preview window, such as aspect ratio, orientation, position, the identity of the specified display device, etc. More specifically, the media display parameter setting unit 210 includes a correction unit 210a, a cutting unit 210b, a zoom unit 210c, a combining unit 210d and a selecting unit 210e, which are respectively similar to the correction unit 110a, cutting unit 110b, zoom unit 110c, combining unit 110d and selecting unit 110e of the first embodiment, and will not be described in detail here.

Figure 6:
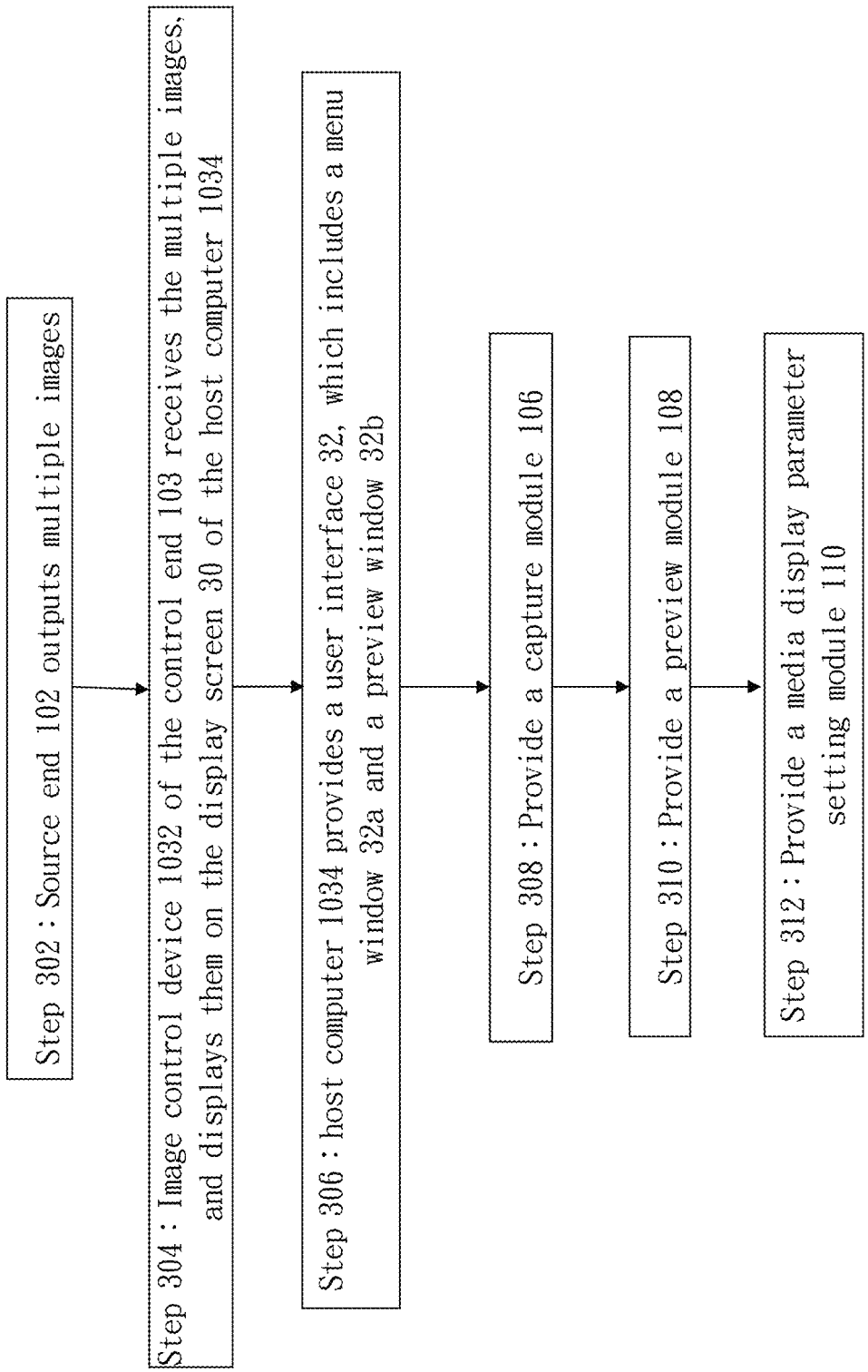
FIG. 6 is a flow diagram according to a third embodiment of the present invention.

Refer to FIG. 6, which is a flow diagram for performing preview image editing according to an embodiment of the present invention. Although the illustrated process flow shows a specific order, the order of the steps may be changed, unless otherwise stated. Thus, the illustrated process flow is only exemplary; the various steps may be executed in different orders, or executed simultaneously. In addition, not all executions must include the same steps, so embodiments of the invention may omit one or more steps. Other process flow may also be used in this invention. The process 300 for providing editable preview images may be executed by the system 100 or the device 200. In the following descriptions, the system 100 is used as an example; and when needed, the components of the device 200 may be used. This embodiment is implemented in a computer usable non-transitory medium, having a computer readable program code embedded therein for controlling an image control device, the computer readable program code configured to cause the image control device to execute the following process:

Step 302: The source end 102 outputs multiple images. The images may be static images or moving images. The transmission of the image data may use an HTML template, using a web page format, to transmit the images to the devices at the display end. Because it uses web page format, web page editing techniques may be employed, such as Java Script or VB Script, to introduce animation effects for enhanced advertising effects. Web page editing techniques are commonly used and well known techniques so they are not described in detail here.

Step 304: The image control device 1032 of the control end 103 receives the multiple images, and displays them on the display screen 30 of the host computer 1034.

Step 306: The host computer 1034 provides a user interface 32, which includes a menu area 32a and a preview area 32b, as shown in FIG. 3.

Step 308: Provide a capture module 106, which provides multiple capture tools 1062 displayed on the user interface 32. As shown in FIG. 3, in one embodiment, the multiple capture tools 1062 includes selection modes such as rectangular selection, circular selection, free-shape selection, select all, etc. The operator chooses one of the capture tools 1062 based on need. After a capture tool 1062 is chosen, it can be used to capture a desired region of the image. For example, the operator may use a mouse to drag a rectangular area, circular area or free shape area on the user interface 32 to select a desired region. In another embodiment, the multiple different specified areas can be selected from the same image. It should be understood that in this disclosure, multiple specified areas may be selected from the same image or different images.

Step 310: Provide a preview module 108, which provides multiple preview windows on the user interface, for receiving the specified areas of images selected by the capture module 106. For example, image A, image B and image C from the source end 102 are transmitted to the image control device 1032 of the control end 103, and the operator uses the capture tools 1062 on the user interface 32 to select specified areas a, b and c from images A, B and C, respectively, which are respectively displayed in the preview windows 1, 2 and 3. In other words, the preview windows 1, 2 and 3 displays the specified areas a, b and c, respectively, as shown in FIG. 3. The number of preview windows depends on the number of source devices of the source end and/or the number of display devices of the display end. The specified areas a, b and c includes image pixels, aspect ratio and other corresponding data.

The steps 308 and 310 do not have a particular order; step 308 may be performed before or after step 310 of the two steps may be performed simultaneously.

Step 312: Provide a media display parameter setting module 110, which displays multiple display parameter groups in the menu area 32a on the user interface 32.

Step 312a: The media display parameter setting module 110 provides a correction unit 110a. The correction unit 110a enables the operator to correct the aspect ratio of the preview window 34 to match the corresponding display screen size on the display end 104. Because the specified area captured using the capture tools 1062 does not necessarily match the aspect ratio of the display device on the display end 104, the correction unit 110a can solve this problem. The correction unit 110a includes a first mode and a second mode. In the first mode, the EDID of the display end 104, including data related to the resolution of the display device, its, manufacturer's name and serial number, etc. is first obtained. Typically, the EDID is stored in the PROM or EEPROM of the display device, and can be obtained using software and displayed. After the host computer 1034 of the control end 103 obtains the EDID, the correction unit 110a automatically adjusts the aspect ratio of the specified area based on the EDID so as to match the screen size at the display end 104. In other words, the first mode is an automatic adjustment mode.

In the second mode, the operator uses the input devices of the host computer 1034 to input commands or related parameters, such as the aspect ratio of the preview window 34. After the image control device 1032 receives these commands, it adjusts the aspect ratio of the specified area. Compared to the first mode, the second mode relies on the manually inputted commands to adjust the aspect ratio, and is referred to as the manual adjustment mode.

Step 312b: The media display parameter setting module 110 provides a cutting unit 110b. The cutting unit 110b enables the operator to cut the specified area into multiple sub-areas. In one embodiment, the display end 104 has a rectangular display area formed by X*X display devices, and the cutting unit 110b cuts the specified area into X*X sub-areas. The image of each sub-area is transmitted to the corresponding display device 104, so that the rectangular display area as a whole displays the image of the specified area. The cutting unit 110b includes a cutting algorithm which, based on pixels of the image signal, selects the start and end pixels of the cuts to determine the cut regions. For example, referring to FIG. 4, to cut the specified area to two sub-areas, the cutting algorithm is as follows:

Sub-area 1: Start at (100, 200); width 1280; height 1024;
Sub-area 2: Start at (1180, 200); width 1280; height 1024;

Taking the above formula for sub-area 1 as an example, it means that starting at pixel (100, 200), a sub-area of width 1280 and height 1024 is cut; sub-area 2 is similarly calculated. Those skilled in the relevant art will appreciate that cutting algorithms are well known, so they are not explained in detail here.

Step 312c: The media display parameter setting module 110 provides a zoom unit 110c. The zoom unit 110c enables the operator to simultaneously enlarge or reduce the sizes of multiple sub-areas. In the above embodiment, the multiple sub-areas processed by the cutting unit 110b can be further processed by the zoom unit 110c to adjust them to designed sizes. In another embodiment, the zoom unit 110c and the correction unit 110a may be combined into one module.

Step 312d: The media display parameter setting module 110 provides a combining unit 110d. The combining unit 110d enables the operator to combine the multiple zoomed sub-areas into the original image. In one embodiment, the combining is based on the start and end pixels of the sub-areas in the cutting algorithm used by the cutting unit 110b. In different embodiments, the cutting unit 110b, the zoom unit 110c and the combining unit 110d may be combined into one module, or may be separate units.

Step 312e: The media display parameter setting module 110 provides a selecting unit 110e. The selecting unit 110e enables the operator to pair the multiple specified areas or multiple sub-areas with corresponding display devices 104 where the sub-images are transmitted to. For example, the specified areas a, b and c may be paired respectively with and transmitted to display devices 1, 2 and 3. In another example, sub-areas 1 and 2 may be respectively transmitted to displays 1 and 2, etc. In another example, the operator can define one image, specified image areas, and their combination to be transmitted to respective different display devices of the display end 104.

Steps 308 to step 312 do not have to be performed in specific orders, and their order may be adjusted according to need, or they can be performed simultaneously. Similarly, steps 312a to 312e also do not have to be performed in specific orders, and their order may be adjusted according to need, or they can be performed simultaneously.

In summary, embodiments of the present invention provide a system and related device that provide editable previous images, and the system includes a capture module, a preview module and a media display parameter setting module. It enables the operator to capture specific areas of the images as preview images, and in the preview mode, set media display parameters for the preview images, such as image cutting, setting aspect ratio, setting corresponding display devices, etc. The system and device according to embodiments of the present invention enhances the practical applicability of the system, for example it can be used in the following applications: a single image transmitted to and displayed on a single display device (one to one), multiple images transmitted to and displayed on a single display device (multiple to one), a single image transmitted to and displayed on multiple display device (one to multiple), and multiple images transmitted to and displayed on multiple display device (multiple to multiple). An advantage of the embodiment of the present invention is that, using only one user interface, under the preview mode, the operator can flexibly adjust the configuration of multiple images, and set the media display parameters for each image, which greatly reduces the complexity of the procedure.

The foregoing descriptions provide details of the embodiments of the invention to facilitate understanding of the invention. Those skilled in the relevant art will appreciate that some of the detailed are not required to implement this invention. In some embodiments, well known structures and devices are not shown in the block diagrams. In the drawings, intermediate components may be present between components shown in the drawings. The components may included additional inputs and outputs not shown in the drawings.

The components described in various embodiments may be separate components, or some or all of the components may be combined into one circuit; therefore, the various elements in the appended claimed may correspond to the function of one or more circuits or components.

Embodiments of the present invention include various computer programs, which may be stored on hard disks to be executed, or embedded in computer readable commands; they may form general purpose or special purpose processor with programmable commands or logic circuitry, for executing the program. The program may also be executed by a combination of hardware and software.

Those skilled in the art may modify the above described methods without departing from the spirit of the invention.

In the above description, when a component A is said to be coupled to or connected to a component B, it means that component A may be directly coupled to or connected to component B, or be coupled or connected to component B via a component C. When it is said that a component, characteristic, structure, process or property A causes a component, characteristic, structure, process or property B, it is mean that A is at least a part of the cause of B, and other component, characteristic, structure, process or property may contribute to the cause of B. When the term "may" is used in the specification, it means that the component, characteristic, structure, process or property is not limited to what is described in the specification. Moreover, the numbers of things mentioned in the specification is not limited by words such as "a" or "one".

It will be apparent to those skilled in the art that various modification and variations can be made in the system and method of the present invention without departing from the spirit or scope of the invention. Thus, it is intended that the present invention cover modifications and variations that come within the scope of the appended claims and their equivalents.

What is claimed is:

1. A system for editing preview images, comprising:
   at least one source end, providing at least one image;
   a control end, coupled to the at least one source end, wherein the control end includes:
     a capture module, for capturing at least one specified area of the image;
     a preview module, for displaying at least one preview window on a display screen of the control end to display the at least one specified area of the image;
     a media display parameter setting module, for setting parameters related to the at least one specified area of the image; and
   at least one display end, coupled to the control end, for receiving the at least one specified area of the image which was displayed in the preview window;
   wherein the display screen of the control end is different from the display end;
   wherein the media display parameter setting module adjusts a size of the specified area according to the setting parameters so as to match a screen size at the display end.

2. The system of claim 1, wherein the size of the specified area has a width and a height and contains image content including image pixels.

3. The system of claim 1, wherein the media display parameter setting module includes a correction unit for correcting an aspect ratio of the specified area according to either a first mode or a second mode, wherein in the first mode, the correction unit obtains Extended Display Identifier Data (EDID) of the at least one display end and automatically adjusts the aspect ratio based on the EDID, and wherein in the second mode, the correction unit receives a command containing parameters, and automatically adjusts the aspect ratio based on the received parameters.

4. The system of claim 1, wherein the media display parameter setting module includes a cutting unit for cutting the specified area into a plurality of sub-areas.

5. The system of claim 4, wherein the media display parameter setting module includes a zoom unit for enlarging or reducing sizes of the plurality of sub-areas.

6. The system of claim 5, wherein the media display parameter setting module includes a combining unit for combining the plurality of sub-areas, after they have been processed by the zoom unit, into one image.

7. The system of claim 4, wherein the display end includes a plurality of display devices, and wherein the media display parameter setting module includes a selecting unit for pairing each of the plurality of sub-areas with one of the display devices of the display end.

8. The system of claim 1,
   wherein the source end includes a plurality of media players for outputting a plurality of images;
   wherein the control end is coupled to a computer, the control end includes an image switch, image distribution device or video matrix; and
   wherein the display end includes a plurality of display devices installed in a predetermined configuration forming a TV wall.

9. The system of claim 1, wherein the preview module simultaneously displays multiple preview windows on the same display screen of the control end.

10. The system of claim 1, wherein the capture module provides a plurality of capture tools for capturing a plurality of specified areas, including a rectangular selection tool for capturing a specified rectangular area, a circle selection tool for capturing a specified circle area, and a free-shape selection tool for capturing a specified free shape area.

11. A device for editing preview images, coupled between at least one external source device and at least one external display device, the device comprising:
   a processing unit;
   a receiver coupled to the processing unit, for receiving at least one image from the at least one external source device;
   a memory unit, coupled to the processing unit, for storing a preview image editing module, which comprises:
     a preview unit for providing at least one preview window for displaying the at least one image on a monitor, the monitor being different from the at least one external display device;
     a capture unit for providing a capture tool for capturing at least one specified area of the at least one image; and
     a media display parameter setting unit for setting parameters related to the at least one specified area of the at least one image; and
   a transmitter, coupled to the processing unit, for transmitting the at least one specified area of the at least one image to the at least one external display device,
   wherein the media display parameter setting unit adjusts a size of the specified area according to the setting parameters so as to match a screen size of the at least one external display device.

12. The device of claim 11, further comprising:
an input unit, coupled to the processing unit, for inputting commands and parameters;
wherein the preview image editing module displays and interacts with a user interface and the at least one preview window displayed on the monitor; and
wherein the size of the specified area has a width and a height and contains image content including image pixels.

13. The device of claim 12, wherein the media display parameter setting unit includes a correction unit for correcting an aspect ratio of the specified area according to either a first mode or a second mode, wherein in the first mode, the correction unit obtains Extended Display Identifier Data (EDID) of the at least one external display device and automatically adjusts the aspect ratio based on the EDID, and wherein in the second mode, the correction unit receives a command containing parameters via the user interface, and automatically adjusts the aspect ratio based on the received parameters.

14. The device of claim 11, wherein the media display parameter setting unit includes a cutting unit for cutting the specified area into a plurality of sub-areas.

15. The device of claim 14, wherein the media display parameter setting unit includes a zoom unit for enlarging or reducing sizes of the plurality of sub-areas.

16. The device of claim 15, wherein the media display parameter setting unit includes a combining unit for combining the plurality of sub-areas, after they have been processed by the zoom unit, into one image.

17. The device of claim 14, wherein the media display parameter setting unit includes a selecting unit for pairing each of the plurality of sub-areas with one of the external display devices.

18. The device of claim 11, wherein the preview unit simultaneously displays multiple preview windows on the same monitor.

19. The device of claim 11, wherein the capture unit provides a plurality of capture tools for capturing a plurality of specified areas, including a rectangular selection tool for capturing a specified rectangular area, a circle selection tool for capturing a specified circle area, and a free-shape selection tool for capturing a specified free shape area.

20. A system for editing preview images, comprising:
at least one source end, providing at least one image;
a control end, coupled to the at least one source end, wherein the control end includes:
    a capture module, for capturing at least one specified area of the image;
    a preview module, for displaying at least one preview window on a display screen of the control end to display the at least one specified area of the image;
    a media display parameter setting module, for setting parameters related to the at least one specified area of the image, including a correction unit for correcting an aspect ratio of the specified area according to either a first mode or a second mode, wherein in the first mode, the correction unit obtains Extended Display Identifier Data (EDID) of the at least one display end and automatically adjusts the aspect ratio based on the EDID, and wherein in the second mode, the correction unit receives a command containing parameters, and automatically adjusts the aspect ratio based on the received parameters; and
at least one display end, coupled to the control end, for receiving the at least one specified area of the image which was displayed in the preview window;
wherein the media display parameter setting module adjusts a size of the specified area according to the setting parameters so as to match a screen size at the display end.

* * * * *